June 23, 1931.  A. REA  1,811,027
POWER DRIVEN SHEARS
Filed Oct. 16, 1930  3 Sheets-Sheet 1
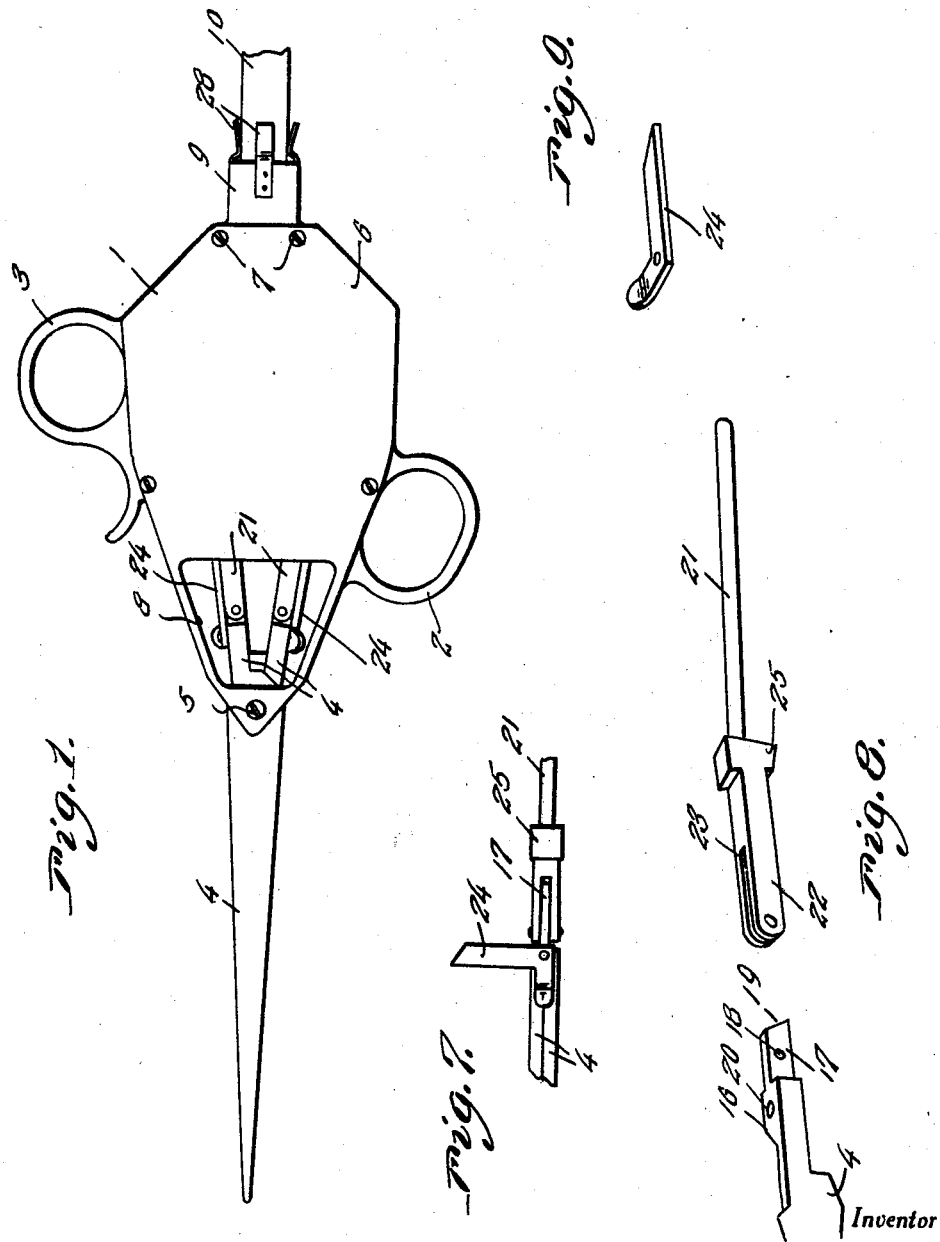
Inventor
Alfred Rea
By Clarence A. O'Brien
Attorney June 23, 1931.  A. REA  1,811,027
POWER DRIVEN SHEARS
Filed Oct. 16, 1930  3 Sheets-Sheet 2
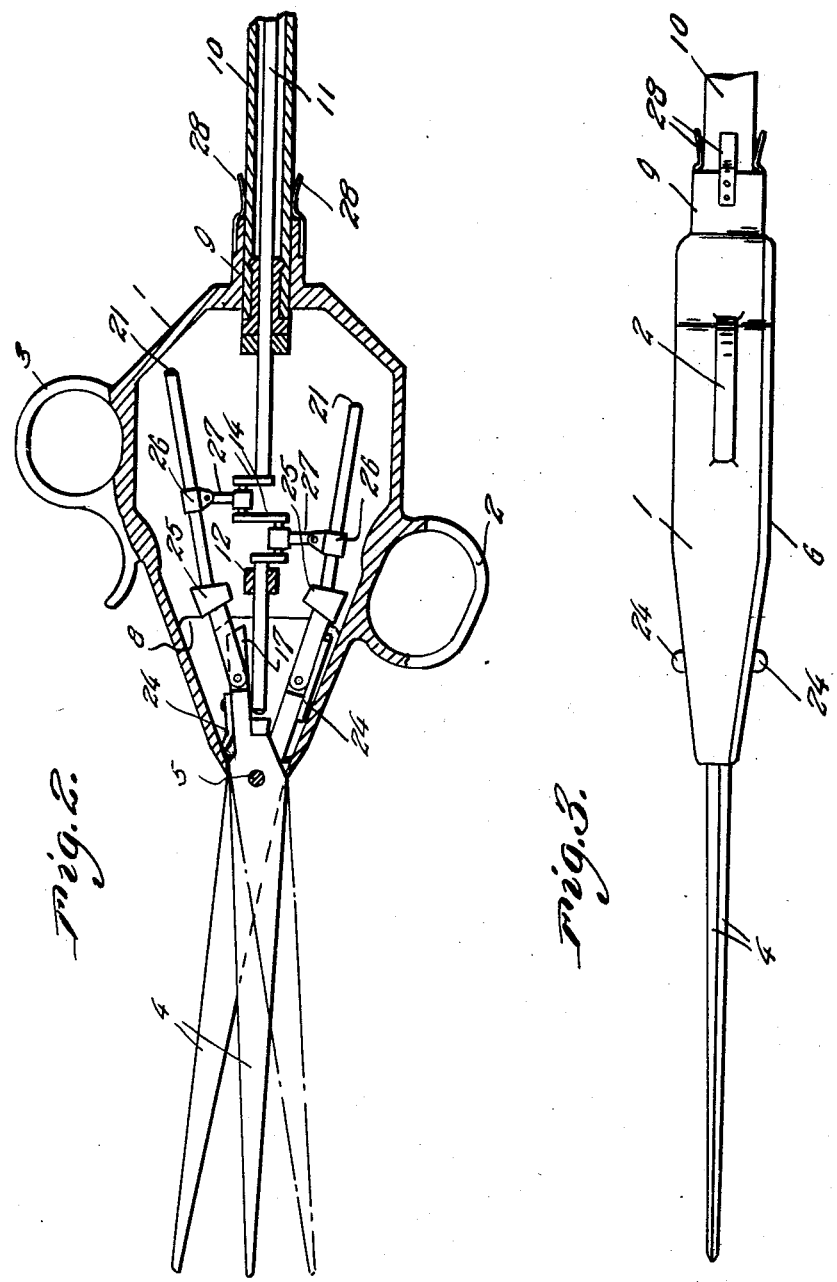
Inventor
Alfred Rea
By Clarence A. O'Brien
Attorney June 23, 1931.  A. REA  1,811,027
POWER DRIVEN SHEARS
Filed Oct. 16, 1930   3 Sheets-Sheet 3
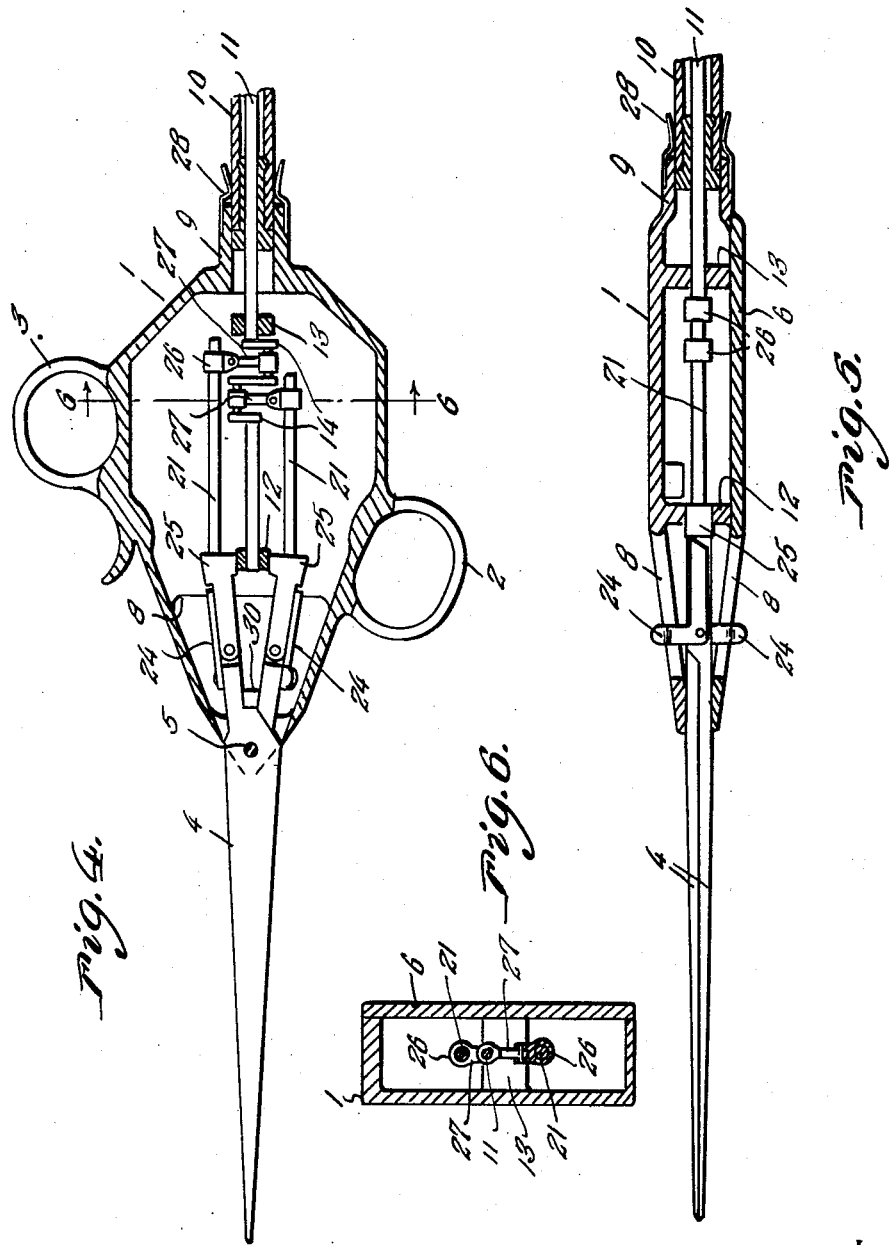
Inventor
Alfred Rea
By Clarence A. O'Brien
Attorney

UNITED STATES PATENT OFFICE

ALFRED REA, OF SAN DIEGO, CALIFORNIA, ASSIGNOR OF ONE-HALF TO JOSEPH McGOWAN, OF SAN DIEGO, CALIFORNIA

POWER DRIVEN SHEARS

Application filed October 16, 1930. Serial No. 489,173.

This invention relates to power driven shears particularly for use by barbers and has for one of its important objects to provide, in a manner as hereinafter set forth, shears of the aforementioned character embodying novel means for expeditiously regulating the cutting stroke of the blades.

Another important object of the invention is to provide power driven shears of the character described embodying means whereby either of the cutting blades may be rendered inoperative when it is so desired.

Other objects of the invention are to provide power driven shears which will be simple in construction, strong, durable, efficient in use and which may be manufactured at low cost.

All of the foregoing and still further objects and advantages of the invention may become apparent from a study of the following specification, taken in connection with the accompanying drawings, wherein like characters of reference designate corresponding parts throughout the several views, and wherein:—

Figure 1 is a view in front elevation of a pair of shears constructed in accordance with this invention.

Figure 2 is a view principally in vertical longitudinal section through the device with one of the cutting blades inoperative.

Figure 3 is a view in top plan of the shears.

Figure 4 is a view principally in vertical longitudinal section showing both of the blades operatively connected to the drive shaft and said drive shaft adjusted to actuate the blades through a comparatively short stroke.

Figure 5 is a view in horizontal longitudinal section taken at right angles to Figure 4.

Figure 6 is a vertical cross sectional view taken substantially on the line 6—6 of Figure 4.

Figure 7 is a detail view in top plan of the keeper or latch through the medium of which the blades are connected to or disconnected from the drive shaft.

Figure 8 is a view in perspective showing one of the blade operating levers and the adjacent end portion of one of the blades which is pivotally connected to said levers.

Figure 9 is a detail view in perspective of one of the keepers.

Referring to the drawings in detail, the reference numeral 1 designates a housing of appropriate size and configuration having formed integrally thereon at its upper and lower sides the thumb and receiving eyes 2 and 3, respectively. At its forward end the housing 1 terminates in a point and is provided with an opening through which the cutting blades 4 extend into the housing and are pivotally mounted on the pin 5. The pin 5 extends transversely between the side walls of the housing adjacent the forward extremity of said housing. One side of the housing 1 is closed by a removable metallic plate 6 which is secured in position by the screws or the like 7. The plate 6 and the opposed side walls of the housing 1 are provided with transversely aligned openings 8 in the forward end portion of the housing.

An integral neck 9 projects rearwardly from the rear end of the housing 1 and slidably receives the flexible conduit 10 which houses the flexible drive shaft 11 which is operatively connected with a suitable source of power, such as an electric motor (not shown). The drive shaft 11 extends rotatably and longitudinally into the housing 1 and is journaled in the transverse bearings 12 and 13 provided therefor in the housing. The bearings 12 and 13 extend from the integral side walls of the housing and have their ends disposed in abutment engagement with the inner side of the removable plate 6. It should be here stated that the drive shaft 11 is slidably and rotatably mounted in the bearings 12 and 13. Cranks 14 are provided on the drive shaft 11 between the bearings 12 and 13.

As best seen in Figure 8 of the drawings, the inner end portions of the blades 4 are provided with flat upper sides 16 and terminate in the reduced extensions or ears 17 having a horizontal opening 18 extending therethrough and terminating in a beveled free end 19. A vertical opening 20 is provided in the inner end portion of each of the blades 4 adjacent the extensions or ears 17. Slightly angled levers 21 are provided with bifurcated end portions 22 for pivotal connection with the ears 17 of the blades 4, the furcations being adapted to receive the ears 17 therebetween, as will be apparent. The wall portion of the levers 21 which extends between the furcations as at 23, is beveled to coact with the beveled end 19 of the extensions or ears 17 for limiting the swinging movement of the levers 21 in one direction relative to the blades 4.

The openings 20 in the inner end portions of the blades 4 receive the pivot pins through the medium of which the substantially L-shaped latch members or keepers 24 are mounted for swinging movement on each of the blades 4. The latches or keepers 24 each includes a relatively long arm constituting the latching portion and a relatively short arm constituting an operating handle or lever. When the latches or keepers 24 are swung to the position illustrated in Figures 4 and 6 of the drawings, the levers 21 will be rigidly connected to the blades 4 in a manner to actuate said blades 4 in both directions upon swinging movement of the levers. When the latches or keepers 24 are swung to the position illustrated in Figure 7 of the drawings, the levers 21 will be permitted to swing in one direction independently of the blades 4. The openings 8 in the housing 1 are provided for the reception of the latches or keepers 24, one of the arms of said keepers extending through the openings when said latches or keepers are disposed in either operative or inoperative position. It will be noted that the upper and lower latches or keepers 24 swing in opposite directions, one of said latches or keepers being operable through the openings 8 in the integral side walls of the housing 1 and the other of the latches or keepers being operable in the opening 8 which is provided in the removable plate 6. Integral heads 25 are provided for abutting engagement with the bearings 12 to provide positive stops for the levers 21. Sleeves 26 are slidably mounted on the levers 21 and are coupled to the cranks 14 by the connecting rods 27. It will thus be seen that a sliding connection is had between the cranks 14 of the drive shaft 11 and the levers 21 which actuates the blades 4. Resilient clamping jaws 28 are mounted on the neck 9 and frictionally engage the flexible conduit 10 for retaining said conduit in adjusted position relative to the housing 1.

In operation, when both of the latches or keepers 24 are in locking or operative position as seen in Figures 1, 4 and 6 of the drawings, the levers 21 are operatively connected to the blades 4 and when the drive shaft 11 is rotated the levers 21 will be actuated through the medium of the cranks 14, the connecting rods 27 and the sleeves 26 as will be readily apparent. When it is desired to regulate the stroke of the blades 4 as to length, the flexible conduit 10 is moved inwardly or outwardly in the housing 1 in a manner to move the cranks 14 toward and away from the pivot pin 5 of the blades 4. Two positions of the shaft 11 which is moved with the flexible conduit 10 are illustrated in Figures 2 and 4 of the drawings.

Should it be desired to render one of the blades 4 inoperative or stationary while the other of the blades 4 is operated, this may be accomplished by simply shifting the latch or keeper 24 on the blade which it is desired to render inoperative from operative to inoperative position as seen in Figures 2 and 7 of the drawings. In Figure 2 of the drawings the upper lever 21 is free to oscillate independently of its respective blade 4 and the lower lever 21 is operatively connected to its respective blade 4 to actuate said blade 4. The reference numeral 30 designates a transverse stop for engagement with the blades 4 to assure the even stopping of said blades when they come together. The free end portions of the handle portions of the latches or keepers 24 are curved for engagement with the upper and lower walls of the housing 1 when the latches or keepers are in the position which permits the respective blades to remain stationary for coaction with the stop member 30 for retaining the stationary blade against idle swinging movement. This is illustrated to advantage in Figure 2 of the drawings.

It is believed that the many advantages of shears constructed in accordance with this invention will be readily understood, and although the preferred embodiment of the invention is as illustrated and described, it is to be understood that changes in the details of construction may be had which will fall within the scope of the invention as claimed.

What is claimed is:—

1. Shears of the character described comprising a housing, a pair of co-acting cutting blades pivotally mounted on the housing and extending thereinto, a pair of levers pivotally connected with the blades for swinging movement independently of the blades and disposed within the housing, a crank shaft mounted for rotary and sliding movement in the housing, means operatively and slidably connecting the crank shaft with the levers in a manner to actuate said levers, and means for selectively coupling the levers to their respective cutting blades in a manner to retain said levers against swinging movement independently of the cutting blades.

2. Shears of the character described comprising a housing, a pair of co-acting cutting blades pivotally mounted on the housing and extending thereinto, levers operatively connected with the cutting blades in the housing, a flexible conduit extending slidably into the housing, frictional means mounted on the housing for retaining the flexible conduit against movement, a drive shaft extending through the flexible conduit into the housing, means for rotatably and slidably supporting the drive shaft in the housing, and means for operatively and slidably connecting the drive shaft to the levers.

3. Shears of the character described comprising a housing, a pair of co-acting cutting blades pivotally mounted on the housing and extending thereinto, levers operatively connected with the cutting blades in the housing, a flexible conduit extending slidably into the housing, frictional means mounted on the housing for retaining the flexible conduit against movement, a drive shaft extending through the flexible conduit into the housing, means for rotatably and slidably supporting the drive shaft in the housing, and means for operatively and slidably connecting the drive shaft to the levers, said means comprising cranks on the drive shaft, sleeves slidably mounted on the levers, and connecting rods coupling the cranks to the sleeves.

4. Shears of the character described comprising a housing, a pair of co-acting cutting blades pivotally mounted on the housing and extending thereinto, levers operatively connected with the cutting blades in the housing, a flexible conduit extending slidably into the housing, frictional means mounted on the housing for retaining the flexible conduit against movement, a drive shaft extending through the flexible conduit into the housing, means for rotatably and slidably supporting the drive shaft in the housing, and means for operatively and slidably connecting the drive shaft to the levers, said means comprising cranks on the drive shaft, sleeves slidably mounted on the levers, and connecting rods coupling the cranks to the sleeves, and latches pivotally mounted on the blades for swinging movement into and out of engagement with the levers in a manner to connect the blades to the levers for swinging movement with said levers or to disconnect the blades from the levers for swinging movement of the levers independently of the blades.

In testimony whereof I affix my signature.

ALFRED REA.